United States Patent [19]

Kragle et al.

[11] Patent Number: 5,761,787
[45] Date of Patent: Jun. 9, 1998

[54] METHOD OF MAKING BONDED PIN EXTRUSION DIE

[75] Inventors: Harry A. Kragle, Corning; Floyd E. Stumpff, Elmira, both of N.Y.

[73] Assignee: Corning Incorporated, Corning, N.Y.

[21] Appl. No.: 565,445

[22] Filed: Nov. 30, 1995

[51] Int. Cl.$^6$ ..................................... B23P 17/00
[52] U.S. Cl. .................... 29/418; 29/558; 425/463; 425/464; 228/161
[58] Field of Search ........................ 29/418, 896.6, 29/558; 264/177.12; 228/161; 425/463, 464; 72/253.1

[56] References Cited

U.S. PATENT DOCUMENTS

| | | |
|---|---|---|
| 3,678,570 | 7/1972 | Paulonis et al. . |
| 3,790,654 | 2/1974 | Bagley . |
| 3,846,197 | 11/1974 | Wiley . |
| 4,041,597 | 8/1977 | Folmar et al. . |
| 4,354,820 | 10/1982 | Yamamoto et al. . |
| 4,486,934 | 12/1984 | Reed ............................ 264/177.12 |
| 4,640,454 | 2/1987 | Yamamoto et al. . |
| 4,653,996 | 3/1987 | Ozaki et al. . |
| 4,780,075 | 10/1988 | Ozaki et al. . |
| 4,820,146 | 4/1989 | Inoue et al. . |
| 4,830,598 | 5/1989 | Inoue et al. . |
| 4,875,264 | 10/1989 | Inoue et al. . |
| 4,984,487 | 1/1991 | Beckmeyer . |
| 5,702,659 | 12/1997 | Kragle et al. ....................... 425/463 |

FOREIGN PATENT DOCUMENTS

| | | |
|---|---|---|
| 0 374 821 | 6/1990 | European Pat. Off. . |
| 374821 | 6/1990 | European Pat. Off. ........... 264/177.12 |
| 57-173431 | 10/1982 | Japan . |

*Primary Examiner*—David P. Bryant
*Attorney, Agent, or Firm*—Kees van der Sterre

[57] ABSTRACT

A honeycomb extrusion die and a method of making the die are disclosed, the die being made by bonding a die discharge section formed as a separate pin array to a separate die body incorporating an array of feed channels, the pin array comprising a plurality of pins attached to and extending outwardly from a body-compatible pin support which is removed after bonding the pins to the body. The pins may be formed of hard wear materials, and may have any of a variety of cross-sectional shapes adapted to improve extrusion uniformity as well as to form honeycomb cells of a variety of different cross-sectional shapes.

4 Claims, 9 Drawing Sheets

METHOD OF MAKING BONDED PIN EXTRUSION DIE

BACKGROUND OF THE INVENTION

The present invention relates to extrusion dies for the extrusion of honeycomb structures from plasticized organic or inorganic batch materials. More particularly, the invention relates to extrusion dies incorporating discharge sections of improved design, and methods for making them.

Conventional extrusion dies for honeycomb extrusion comprise a feed or inlet section, provided with a plurality of feedholes for the input of extrudable material to the die, and a discharge section connecting with the feed section for reforming and discharging the extrudable material from a discharge face of the die. As discharged, the material is reformed into a honeycomb shape comprising a plurality of open-ended channels bounded by interconnecting cell walls extending from one end of the structure to another in the direction of extrusion.

The discharge opening in the discharge face of these dies may be configured to form any of a variety of shapes for the interconnecting honeycomb wall structure. Currently, the discharge openings used for the extrusion of commercial ceramic honeycombs for treating automotive and other combustion exhaust gases are formed by a criss-crossing array of long straight discharge slots. These long slots intersect to form a network of shorter slot segments for the forming of straight walls for square- or triangular-celled honeycombs.

Extrudable material processed through these commercial dies must follow a complex flow path. The material first moves from each feedhole through a transition zone into base of the slot array, wherein it must flow laterally to join with material from adjacent feedholes. Thereafter, the knitted material is again directed forwardly in the direction of feedhole flow toward the discharge opening formed by the slots, being discharged therefrom in the form of an array of interconnecting "webs" or wall portions forming the channel walls of the honeycomb.

The cross-sectional shapes of the islands or "pins" formed on the discharge faces of these extrusion dies by the intersecting slot segments govern the internal shapes of the channels in the extrudate. With conventional slotting these pins are typically of a rectangular or triangular cross-sectional shape, although other shapes are possible using more elaborate die slotting techniques.

Extrusion dies useful for the extrusion of these types of honeycombs are disclosed in U.S. Pat. No. 3,790,654 to Bagley. As disclosed in that patent, the feedholes typically extend slightly into the discharge slot region of these dies, i.e., in the direction of material flow through the die. This extension or overlap of feedholes and slots extends and enlarges the hole/slot interface through which all of the material for forming the honeycomb wall structure must pass. Without this overlap, the transition between the holes and slots in these dies would present much higher impedance to batch flow from the feedholes into the slots.

One of the problems which must be addressed in the design of honeycomb extrusion dies for plasticized ceramic batches is that of internal wear on die surfaces by the abrasive ceramic materials being extruded. The extrusion rates at which conventional honeycomb manufacture is carried out require that the batch material flow from the relatively slow-flowing feedhole section through the feedhole/discharge slot transition zones within a few hundredths of a second. Batch flow rates spike up to very high values in these transition zones, tending to cause rapid wear at the hole/slot intersections.

A number of patents, including U.S. Pat. Nos. 4,653,996, 4,820,146, 4,830,598 and 4,875,264, describe attempts to extend the service life of honeycomb extrusion dies through the use of wear-resistant die components. Typically, these involve the application of hard wear materials to the outlet face of the die, an approach which does not address die wear at the bases or so-called "root" areas of the pins in the feedhole/slot transition zones. These pin roots, which provide the sole means for anchoring the pins to the die body, constitute the sites of most rapid die wear due to the high batch flow rates and batch flow direction changes which occur in the pin root area. To date, the only protection for these internal portions of the die matrix has been that of vapor-deposited wear coating materials. Thus better means of protecting or strengthening the pin roots are continually being sought.

Die modifications for the purpose of improving the lateral flow of batch material along the slots prior to discharge, to improve wall knitting and channel integrity in the resulting honeycombs, have also been proposed. One approach for improving this lateral flow has been the use of pooling or distribution slots, positioned beneath the discharge face of the die, for collecting and integrating the batch material prior to discharge from the die face. Dies of this type are disclosed in U.S. Pat. Nos. 4,354,820 and 4,780,075, and in published Japanese patent application 57-173431.

In the '820 and '075 patents the die is formed by providing feedholes in the inlet surface of a die body plate and relatively wide discharge slots on the opposite or outlet face of the plate. A hard facing sheet is then bonded to the outlet face, and is thereafter narrowly slotted to provide a die discharge face with narrow discharge slots alighed with and overlying the wider slots previously formed in the body plate.

Published Japanese application 57-173431 teaches another fabrication approach wherein a body plate comprising feedholes and a faceplate comprising wide distribution slots on one face are joined by bonding the slotted face of the face plate to the drilled body plate. The formation of the discharge slots is then completed by cutting narrower discharge slots into the wider distribution slots previously formed in the faceplate.

While helpful for batch redistribution, these approaches introduce a further complexity into the manufacture and use of these dies. Diffusion bonding and other techniques which have been used to bond together the various die components in compound die structures involve exposure of the die fabrication materials to high pressures and/or temperatures. These conditions cause differential thermal creep in the materials, resulting in die defects which often include a functionally critical distortion in the fine feedhole arrays formed in the pre-drilled die body plates.

Distortions of this sort make it very difficult to achieve accurate alignment between machined features formed prior to joining and those formed after joining diverse die components. For example, full-face registry of a fine pre-drilled feedhole array with a subsequently-formed, fine discharge slot array is almost impossible to achieve and very expensive to approach. Yet any lack of accurate slot registry can cause significant extrusion difficulties such as uneven extrusion, missing or distorted cell walls, and other structural defects in the extruded products.

The all-glass laminated die design of U.S. Pat No. 3,846,197 uses construction and slotting methods less prone to slot misalignment, avoiding the need to slot or drill after joining. However, the glass materials employed in these dies are simply not adaptable to the fabrication of strong, tough, wear-resistant extrusion dies such as required for the commercial production of high-cell-count ceramic honeycombs.

Another shortcoming of existing honeycomb extrusion dies, and of techniques for making them, relates to the die design constraints arising from the straight-line machining technology currently applicable to the fabrication of the dies. Linear cutting and drilling techniques make it very difficult to produce honeycomb designs wherein the geometry of the cells is not regular and polyhedral (e.g., triangular, square, or rectangular). Thus dies for honeycombs with rounded or irregular cell shapes, as well as for honeycombs wherein the outer or peripheral cells differ in size or shape from the those of more central cells, are not easily made using these kinds of fabrication methods.

A principal object of the present invention is to provide a die design and die fabrication method which overcomes the aforementioned shortcomings and disadvantages.

A further object of the invention is to provide a honeycomb extrusion die, and a method for uniting two or more different structural materials in the fabrication of the die, to simultaneously achieve improved batch distribution, better extrusion performance, and improved die wear resistance for extended service life.

A further object of the invention is to provide an extrusion die wherein the pins forming the discharge opening for honeycomb cell wall formation are of arbitrary size, shape, and composition.

Other objects and advantages of the invention will become apparent from the following description thereof.

SUMMARY OF THE INVENTION

The extrusion die of the present invention is of composite of "bonded pin" design, the discharge slots or other openings being formed by the interconnected spaces between the pins in a pin array bonded to the body of the die. The design insures accurate registry between the discharge opening and the extrudate feed channels in the body of the die. Further, an improved pin design facilitates easier lateral redistribution of batch material upstream of the discharge opening, promoting uniform extrusion characteristics and higher wear resistance.

The pin configurations in the dies of the invention feature narrowed pin root portions which provide significant enlargment of the space at the base of the discharge section, i.e., the inter-pin space near the feedhole/discharge interface within the interior of the die. The narrowed pin root portions can yield an inter-pin cross-sectional area at the pin roots which is two or more times the area of the inter-pin or discharge opening at the discharge face of the die. Thus these dies provide lateral flow efficiency much greater than that of traditional dies employing only feedhole/slot overlap to facilitate lateral batch distribution.

The die designs and fabrication methods of the invention effectively address the problems of material creep and associated slot/feedhole mis-registry which are known to arise in prior art die fabrication methods involving the high temperature bonding of pin arrays to pre-drilled die body plates. In the method of the invention, distortion effects are avoided by including a body-compatible sacrificial pin support member as part of the pin array for the discharge section of the die. This pin support is removed after the pins have been permanently bonded to the die body.

Preferably, the pin support is formed of a material with substantially the same thermal history and expansion characteristics as those of the die body. In this way registry between the pin array and the die body throughout the bonding process is most effectively insured. The pins themselves may be of the same composition as the support or, advantageously, of a differing composition selected for optimal low-impedance extrusion and/or extended pin service life. These pins may differ substantially in thermal expansion and other characteristics from the die body, provided only that they are sufficiently compatible with the die body or any bonding material used for pin attachment to permit durable bonding of the pins to the die.

A further advantage of the method of the present invention is that the pins need not be limited in shape to those formed by straight-line machining methods such as slotting. More flexibly, pins of round, arcuate, or other non-linear cross-sections, as well as rectangular or triangular pins, may conveniently be employed. Thus the configuration of the discharge openings in these dies is not restricted to criss-crossing slot patterns, as in most prior art honeycomb extrusion dies.

In a first aspect, then, the invention comprises a method for making a honeycomb extrusion die through the bonding of a semi-finished pin array to a die body of selected composition. In the practice of that method, a die body having a die inlet face and a feedhole outlet face is first provided. The die body will incorporate an array of feedholes or conduits extending from the die inlet face to the feedhole outlet face.

Also provided is at least one pin array on a pin support, the pin array comprising a plurality of pins attached to and extending outwardly from the pin support. The pins are of uniform or smoothly graded length such that they collectively terminate at unattached pin root ends spaced from the pin support and lying in a common plane.

The die body and pin array are next assembled so that the pin root ends are aligned with pin attachment points on the feedhole outlet face of the die body, those attachment points being located between the feedhole or feed channel outlets. Thereafter, the pin root ends are permanently joined to the die body by a suitable bonding technique to form a preform for the die. Diffusion bonding, brazing, beam welding, other permanent attachment methods may be used for this purpose.

The die preform thus provided is finally converted to an operative die by separating the pin support from the bonded pins. Removal may be by conventional cutting, grinding, or other metal removal techniques. If desired, the die may then be conventionally coated, polished, or otherwise finished for use, the particular finishing procedure selected being one appropriate to the particular honeycomb extrusion process or powder extrusion batch material to be employed.

DESCRIPTION OF THE DRAWINGS

The invention may be further understood by reference to the drawings, wherein.

DETAILED DESCRIPTION

Figure 1A:
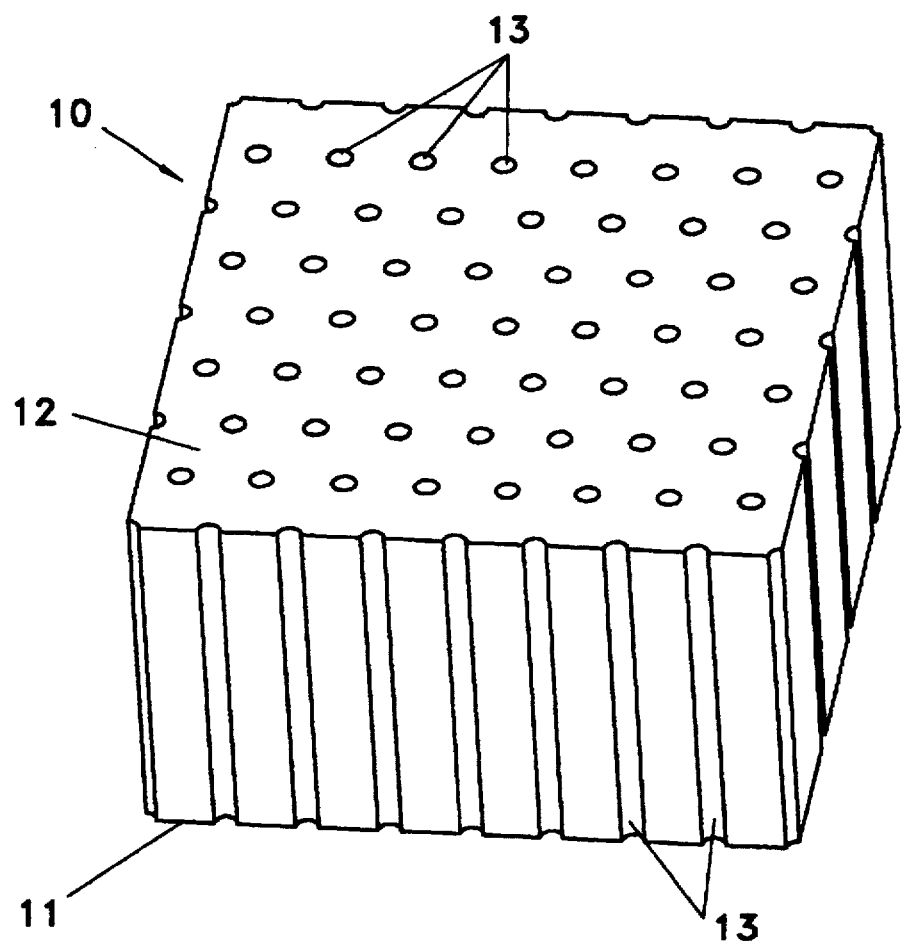
FIGS. 1A–1D illustrate the fabrication of an extrusion die in accordance with the invention.

A generalized procedure for the assembly of a honeycomb extrusion die in accordance with the invention is illustrated in FIGS. 1A–1D of the drawing. Those illustrations, and all of the other drawing Figures presented herein, have been schematically drawn and enlarged for purposes of illustration; no attempt has been made to depict any of the dies and die components of any of the drawings in true proportion or to scale.

As shown in FIG. 1A, a die body 10 having a die inlet face 11 opposite a feed hole outlet face 12 is provided with an array of feedholes such as feedholes 13 for conveying plasticized batch material through the die. The die body is typically a unitary plate of metal or other strong, non-brittle material which is sufficiently thick to withstand the pressures of extrusion, although more complex die body constructions may be used as well.

Figure 1B:
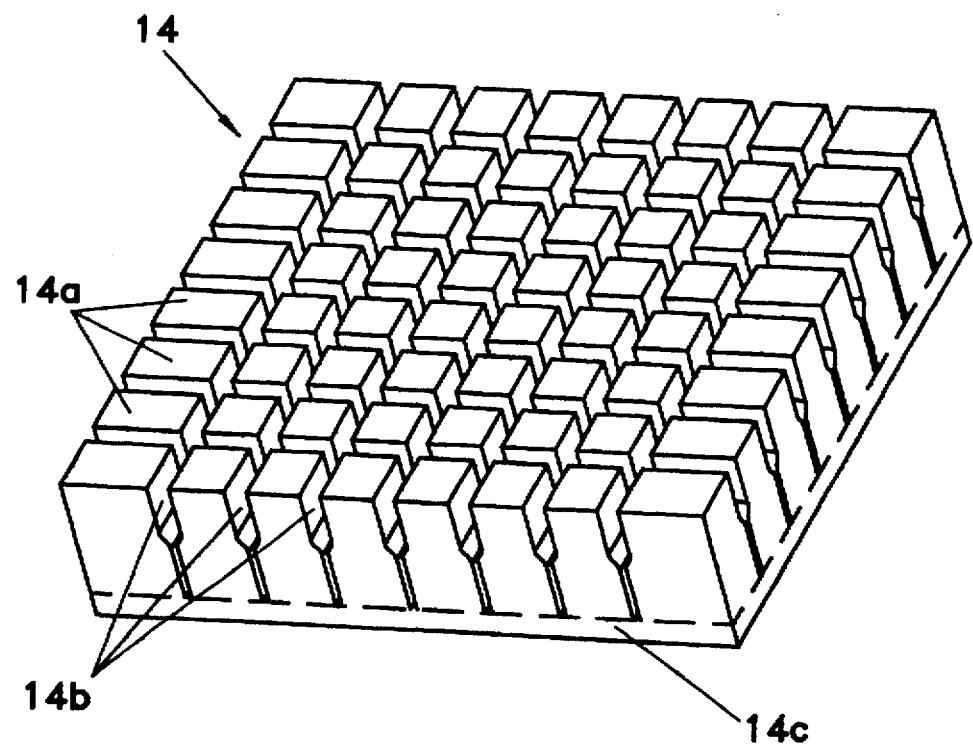

A preform for providing a slotted discharge section for the die is schematically illustrated in FIG. 1B of the drawing. That preform is a machined plate 14 which incorporates a pin array made up of pins 14a formed between intersecting discharge slots 14b. The array of pins 14a lies on but extends outwardly from a pin support 14c, which in the embodiment of FIG. 1B is that bottom surface portion of plate 14 lying below the broken line indicating the depth of slots 14b in the machined plate.

Pin support 14c provides a supporting membrane or layer for maintaining the configuration of slots 14b and the spacing and alignment of pins 14a in the preform. Thus the outer ends of pins 14a in the array, termed the pin root ends in the final die assembly, are aligned with and collectively terminate in a common plane.

Figure 1C:
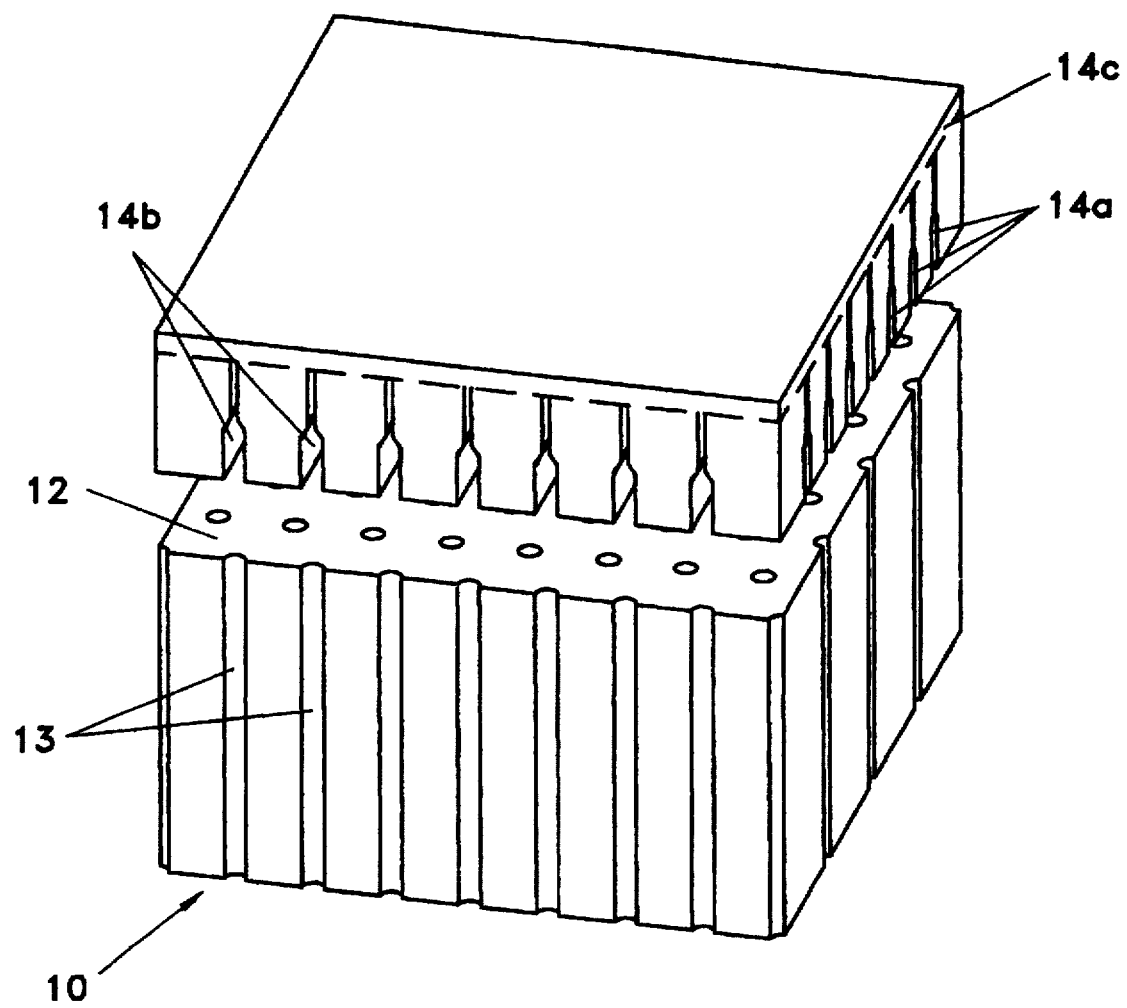

An extrusion die is formed from die body 10 of FIG. 1A and discharge section preform 14 in FIG. 1B by assembling the die body and preform as shown in FIG. 1C. Alignment during assembly is such that the root ends of pins 14a on plate 14 are aligned with appropriate pin attachment points on feedhole outlet face 12 of the die body. These attachment points (not shown) occupy locations between feedholes 13 on die body 10, so that the feedholes will not be blocked by the pin root ends but will instead open substantially without obstruction into slots 14b.

Figure 1D:
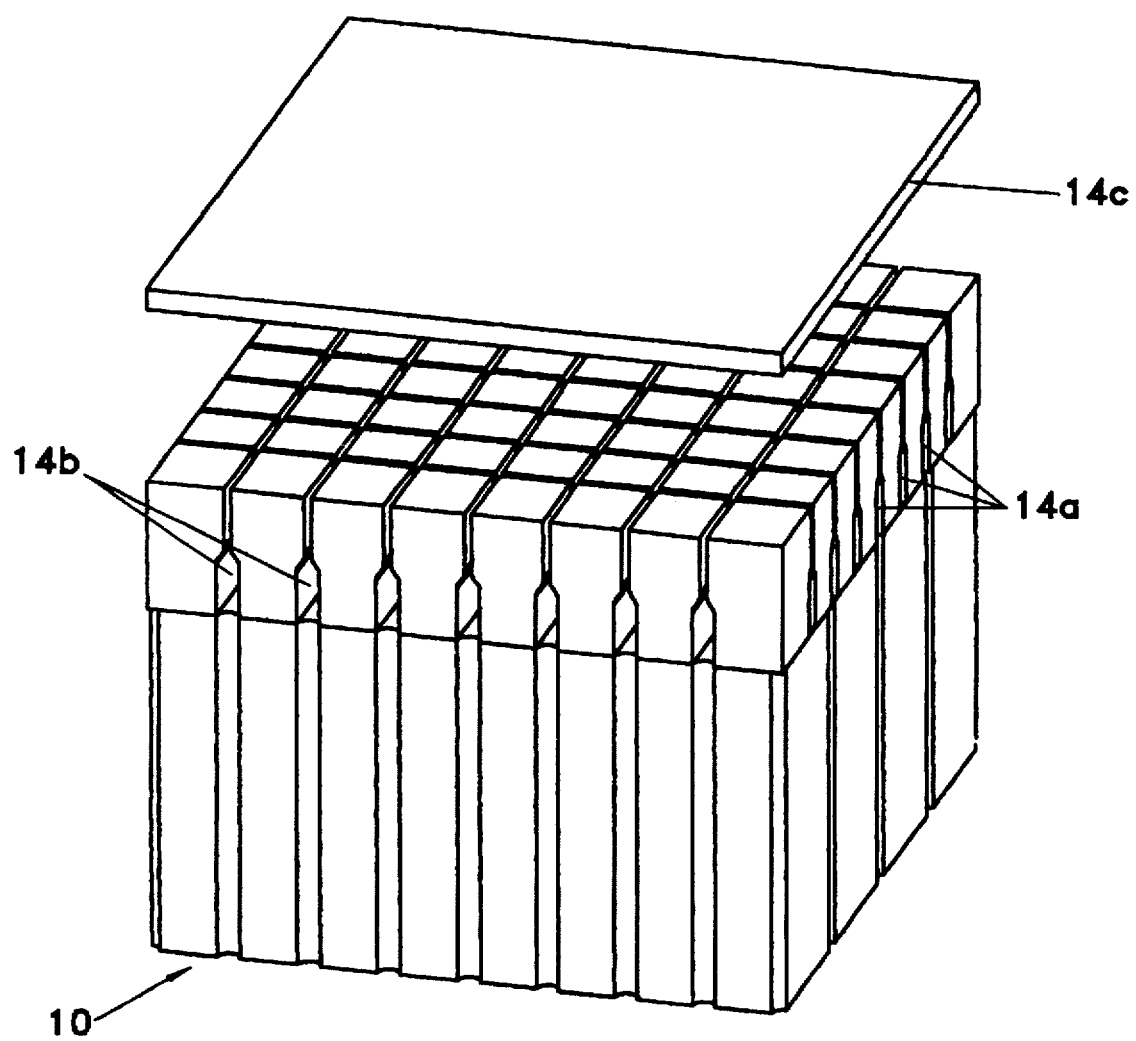

Plate 14 and die body 10 are next joined, as illustrated in FIG. 1D, by a suitable bonding technique. The technique used must be one which will result in the permanent attachment of the pin root ends to the attachment points on the die body. Brazing, soldering, and diffusion bonding are examples of procedures which may be used, with diffusion bonding processes being particularly preferred.

As further shown in FIG. 1D, after the bonding of these die components has been completed, pin support 14c is removed from the array of pins 14a to expose the tops of those pins and discharge slots 14b. Removal may be by cutting, grinding, or other techniques. The through-slotted remainder of plate 14 exposed by this removal thus becomes the discharge face of the extrusion die.

As previously noted, it is desirable that the pin support be formed of a material similar in thermal expansion and high temperature creep characteristics to the material used to form the die body. Similar die body and pin support materials will behave similarly during high temperature bonding procedures such as diffusion bonding, assuring that the initial registry of the pin root ends with their attachment points on the die body will be maintained throughout the bonding procedure.

A particular advantage of the die fabrication procedure of the invention is that it enables the precise assembly of extrusion dies incorporating discharge sections of hard, wear-resistant materials, even where such materials may differ significantly in thermal expansion and creep properties from the selected die body material.

Figure 2:
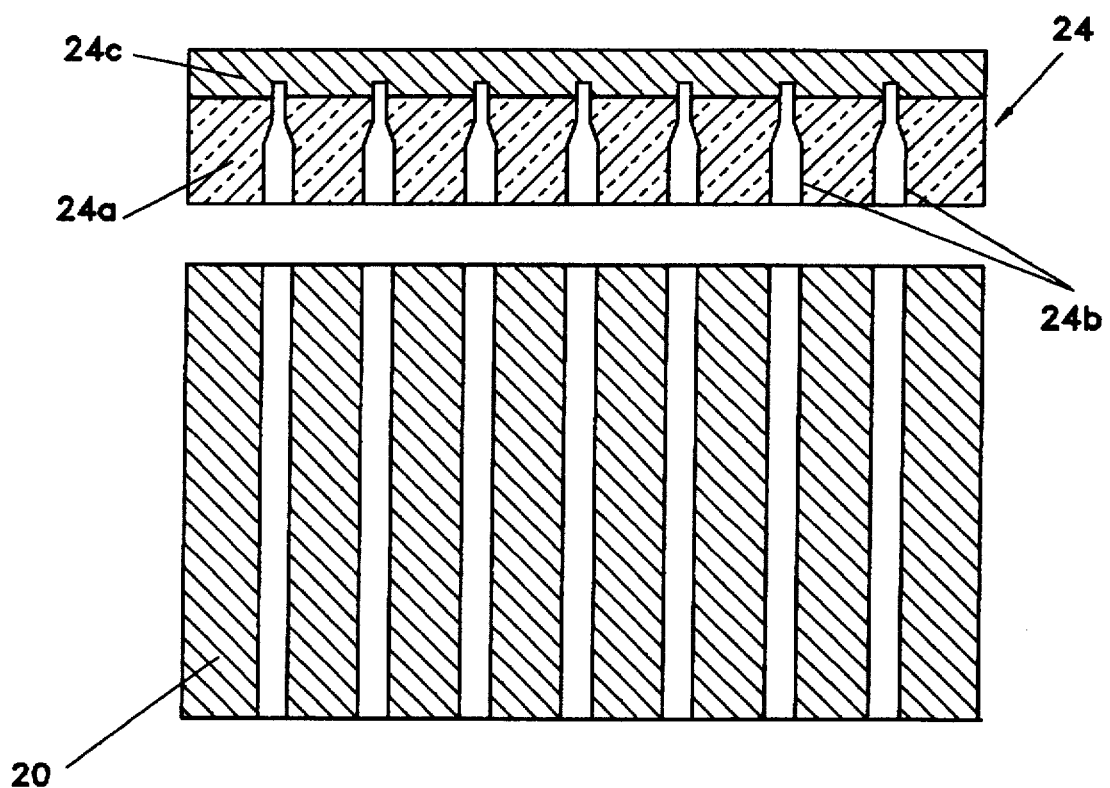
FIG. 2 shows an alternative pin array and support for the fabrication of an extrusion die of the invention.

An example of a preform for a slotted discharge section of such a die is schematically illustrated in FIG. 2 of the drawing. FIG. 2 provides a cross-sectional elevational view of a die body 20 and a machined preform 24 for a discharge section to be bonded thereto. Preform 24 is a laminated composite plate comprising a lower facing portion or layer into which have been machined a plurality of slots 24b forming a plurality of pins 24a. These pins are attached to an upper layer of preform 24 designated 24c.

The lower facing portion of preform 24 forming pins 24a is formed of a hard, wear-resistant material which has been slotted through by machining discharge slots 24b therein after bonding to upper layer 24c. Upper layer 24c remains largely unslotted, and so provides the required pin support to maintain the orientation and spacing of the pins 24a formed in the hard material layer.

In the embodiment shown, pin support 24c is formed of the same material, e.g., stainless steel, as is used to form die body 20, while the pins in layer 24a may be formed of a hard material such as tungsten carbide. Because of the similar thermal characteristics of die body 20 and pin support layer 24c, the shifting of discharge slots 24b with respect to feedholes 23 in die body 20 during the bonding of the pins to the die body can be substantially entirely avoided. Accordingly, the later removal of pin support 24c from the assembly after bonding pins 24a to die body 20 provides a wear resistant die with excellent feedhole/slot registry across the entire discharge face thereof.

As suggested in each of FIGS. 1D and 2 of the drawing, a particular advantage of the die fabrication method of the invention is one of flexibility with respect to pin configuration. In general, the knitting of separate feedhole streams of extrudable material to form an interconnecting honeycomb cell wall structure requires easy lateral movement of the material after discharge from the feedholes but prior to final discharge from the die. Freedom of lateral movement within the die can be promoted if the pin root ends are relieved or reduced in diameter or area in comparison to the outer ends of the pins. Conversely stated, the cross-sectional areas of the pins at or proximate to the die discharge face should be larger than the cross-sectional areas of the pins at or proximate to their points of attachment to the die body.

In the pin array illustrated in FIG. 1B of the drawing, criss-crossing discharge slots 14b have been machined so that they are wider at the slotted face of plate 14 (the pin root ends) than at the ends of the slots extending to pin support 14c. The effect of this slot design is that the root ends of pins 14a, which become attached to die body 10 adjacent feedholes 13 (FIG. 1D), are relieved, being smaller in size than the pin ends forming discharge face 14d of the illustrated die assembly. This relief of the pin root area favors lateral over axial movement of the extrudable material within the pin root area of the assembly during passage of the material through the die.

The pin arrays illustrated in FIGS. 1B and 2 are illustrative of pin configurations resulting from ths use of linear machining techniques to form criss-crossing discharge slots. In general, such techniques constrain pin shapes to those with straight-sided cross-sections. Yet most other methods for machining discharge slots and pins are not economical.

Therefore, for a variety of honeycomb applications requiring circular or other non-linear cell cross-sections, the fabrication of extrusion dies has been difficult and expensive.

The present invention includes methods for providing a pin array on a pin support, wherein the pins may be machined to essentially any desired cross-sectional shape. In that method, individual pins or pin preforms are fabricated and then used to form a pin array on a unitary pin support. The supported pin array is next permanently joined to a die body in the same manner as illustrated in FIGS. 1C–1D and FIG. 2 of the drawings, and the pin support is then removed to expose the pins and discharge opening for the die.

A particular implementation of this approach, illustrated in FIGS. 3A–3D of the drawing, is one wherein a "double" pin preform design is used. This pin design provides two similar or identical pin arrays from a single pin assembly.

Figure 3A:
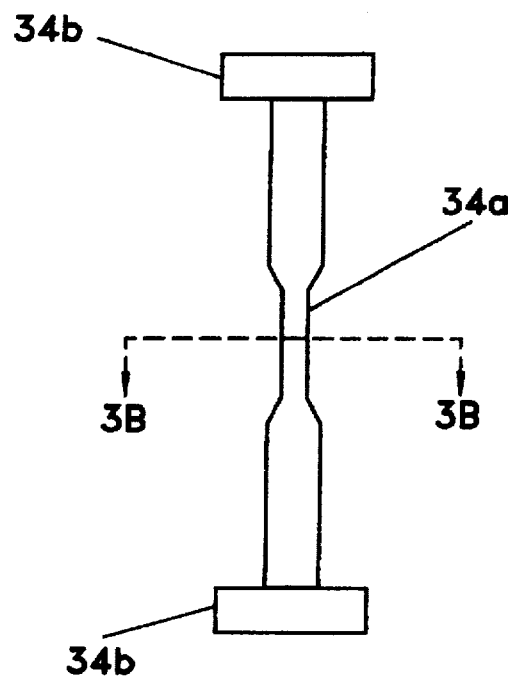
FIGS. 3A–3D illustrate the assembly of a supported pin array from a plurality of discrete pins.
Figure 3B:
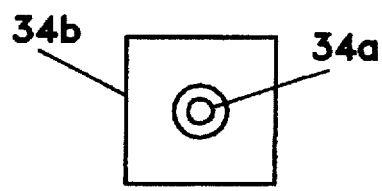

To make the arrays a plurality of individual pin preforms 34, each individual pin having the shape shown in FIGS. 3A and 3B of the drawings, is first provided. Each of these pins incorporates a central pin portion 34a bounded by upper and lower pin base portions 34b, base portions 34b serving to align and properly space central pin portions 34a from each other as they are collected is into a pin array.

Figure 3C:
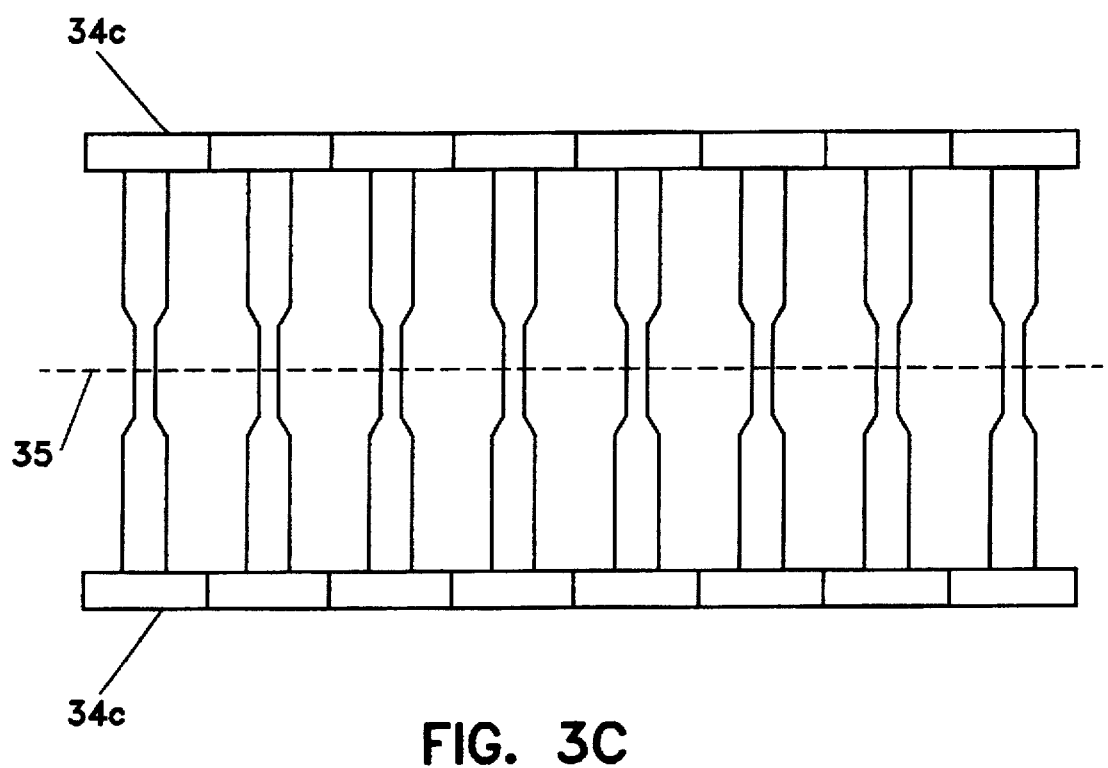

To form the required pin array, the pins thus provided are assembled to form a pin bundle as shown in FIG. 3C. The bundle is a unitary assembly formed by bonding pin bases 34b of FIGS. 3A–3B together into opposing temporary pin supports 34c. The intermediate product of FIG. 3C is thus an array comprising a plurality of central pin portions 34a supported between a pair of opposing bonded pin supports 34c, the broken lines in 34c corresponding to the bonding interfaces between original pin bases 34b.

Figure 3D:
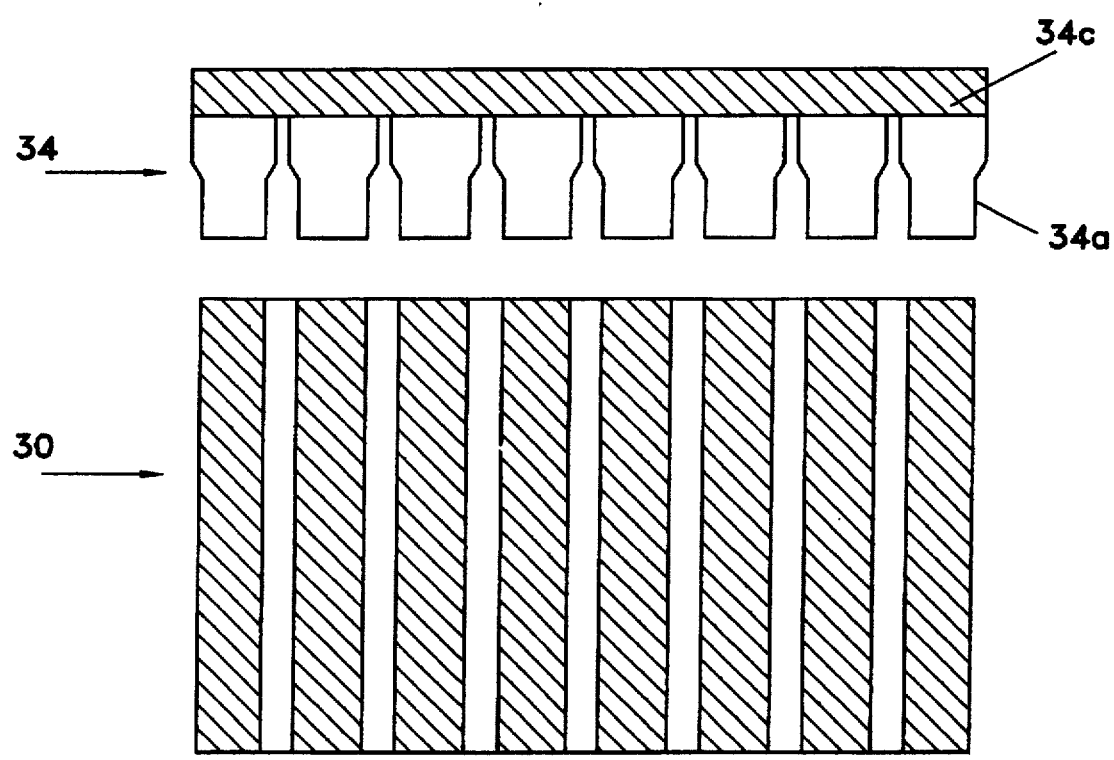

To form two final pin arrays for bonding to a die body, the assembly of FIG. 3C is divided by cutting along mid-plane 35 of the assembly. As shown in FIG. 3D, each of the two resulting parts is a separate pin array 36, comprising round pins 34a extending from a base 34c and terminating in a common plane corresponding to mid-plane 35 in FIG. 3C. As thus formed, pin array 36 is suitable for bonding to a drilled die body such as die body 30 in FIG. 3D, with base 34c thereafter being removed to form the finished round-pin extrusion die.

While discrete pins 34 illustrated in FIGS. 3A–3B have a circular cross-section, it will be appreciated that other pin cross-sections could readily be accommodated by the illustrated method. Thus oval, hexagonal, rhombic, pentagonal, rectangular, or any other of a wide variety of alternative pin shapes and arrangements, enabling the economic production of honeycombs with correspondingly varied or complex cell arrangements and/or cross-sections, could equivalently be employed.

Figure 4:
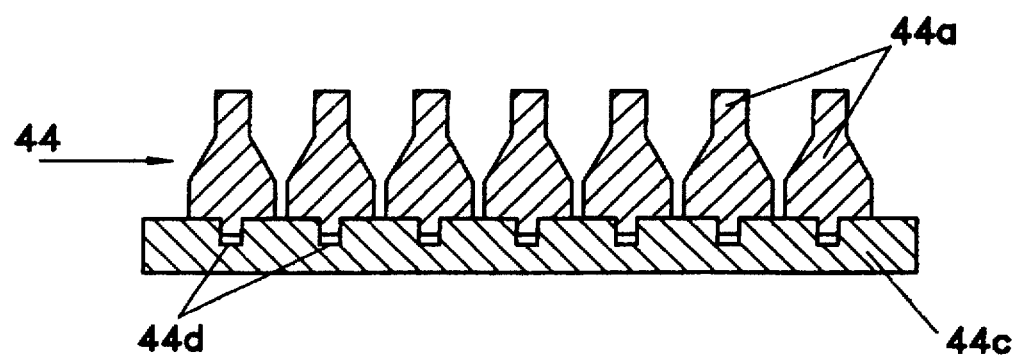
FIG. 4 illustrates an alternative supported pin array incorporating discrete pins.

In other adaptations of the discrete pin approach, the pin support is not a bonded assembly of pin base portions but instead is a separate sheet or plate of support material, drilled or otherwise adapted to support the array of pins during the bonding of the pins to the die body selected. FIG. 4 of the drawing provides a schematic elevational view in cross-section of a supported pin array produced by that method.

Referring more particularly to FIG. 4, supported pin array 44 consists of a pin support 44c consisting of a metal plate into one surface of which blind holes 44d have been formed by drilling or the like. Pins 44a are permanently positioned and aligned on support 44c by means of pin extrusions which are inserted into blind holes 44d. Thus the orientation, spacing and location of the pins can be predetermined by the spacing and locations of the holes.

After the pins have been firmly attached to the support, the exposed opposite or root ends of pins 44a may be bonded to a suitable die body (not shown). Support 44 may then be removed, in a manner similar to that illustrated in FIG. 1D, by cutting or other suitable means. It will be apparent from a study of FIG. 4 that pins 44b may be of essentially any cross-sectional size and shape desired to form a honeycomb of a selected cell shape and cell wall thickness. Further, holes 44d provide only one means for supporting an array of pins such as 44a on a plate such as 44c; other pin attachment means, including soldering, brazing or the like, could alternatively be used.

Figure 5:
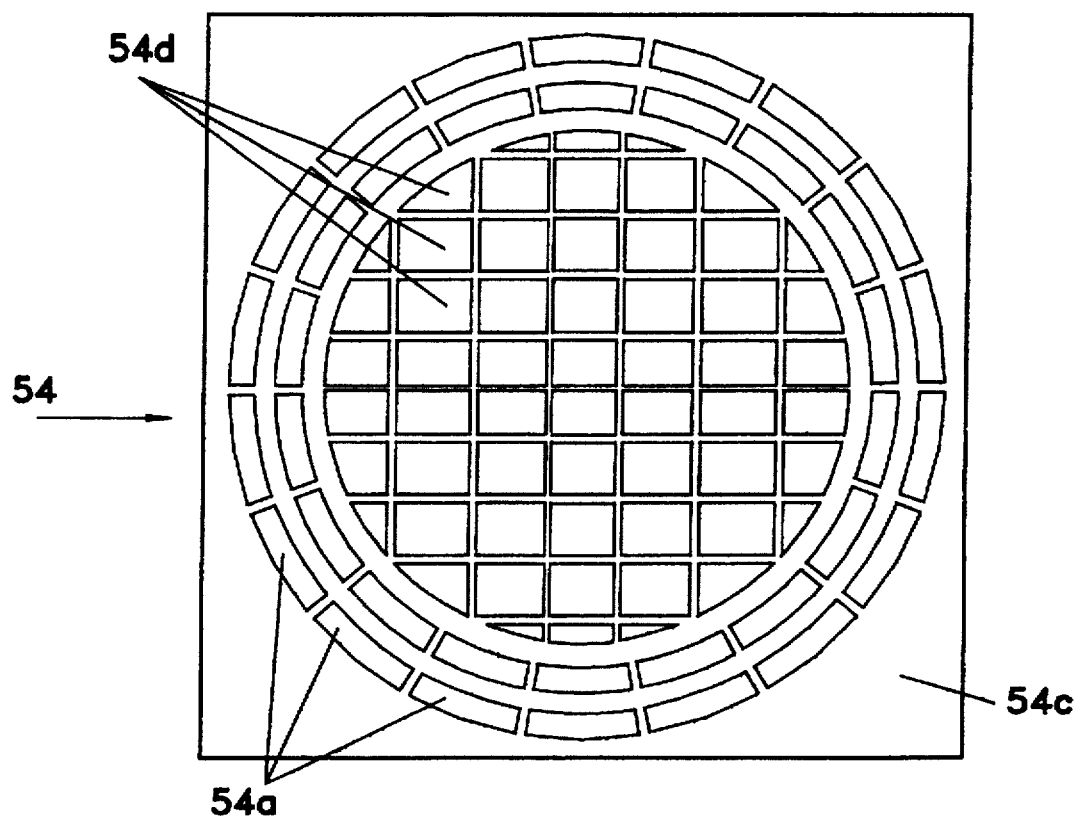
FIG. 5 illustrates a supported pin array incorporating multiple pin shapes.

Either of the methods described above for forming pin arrays from discrete pins can be used to provide extrusion dies wherein the pin cross-sections, and thus the cross-sections of the channel openings in a honeycomb extruded through the pin array, are not uniform across the entire face of the extrusion die. FIG. 5 of the drawings is a schematic top plan view of such a pin array, wherein the pin cross-sections are configured for the extrusion of a honeycomb with two different cell cross-sections. Referring more particularly to FIG. 5, two different pin types, illustrated by pins 54a and 54d in the figure, are bonded to a pin support 54c. Pins 54a are shaped to form an extruded material into the walls of an array of curved elongated cells about the periphery of an extruded honeycomb, while pins 54d are configured to form a more conventional cell array of square cell cross-section within the central or core portion of the extruded honeycomb.

An extrusion die for the production of such a honeycomb can be fabricated by bonding the pin array shown to any compatible die body with suitably arrayed feed throughholes. Thereafter, in the manner of FIG. 1D, pin support 54c may be cut or otherwise removed from the bonded pins. The use of diverse cell configurations such as illustrated in FIG. 5 can be particularly valuable for purposes such as improving the strength of the extruded honeycomb body, modifying fluid flow through the body by varying cell configuration across the face of the honeycomb, and for other purposes known in the art.

The configuration of the die body used to support a pin array provided as herein described is not critical. Suitable feedholes, or equivalently any arbitrarily-shaped feed channels, may be provided in machinable materials by mechanical, laser, or chemical drilling. They may be simply arranged in regular arrays of parallel feedholes as hereinabove described, or instead provided as complex or irregular patterns of straight or curved feed channels adapted to conform to and most efficiently feed the particular shapes, spacings and locations of pins and discharge openings required for the honeycomb shapes to be extruded. Particularly in the case of complex feed channel designs, the die body may not be fabricated from a single block of stock material, but may instead be assembled fron multiple plate, sheet, or other shapes which have been perforated and arranged to provide the required feed channel array through the assembled body of the die.

Materials to be employed for the fabrication of honeycomb extrusion dies by the methods of the invention will be selected according to the products to be extruded and the processes by which the extrusion is to be carried out. For high-viscosity batch formulations such as plasticized ceramic or other inorganic particulate batch compositions, machinable materials of high yield strength, such as high strength tool steels or stainless steel alloys, constitute the preferred fabrication materials for the body sections of the dies.

For many applications, tool or stainless steels will also constitute acceptable fabrication materials for the pin arrays to be incorporated into the dies. In fact, such materials have higher utility in the present die configurations than in conventional dies, for the reason that the pin configurations employed significantly reduce the rate of wear on the root portions of the pins. This is because pin wear by abrasive materials present in ceramic and other extrusion batches is no longer concentrated in the pin root area of the die, but instead occurs primarily on downstream side or edge surfaces of the pins, e.g., at the points of slot narrowing or pin expansion within the discharge section of the die.

As previously suggested, other materials may be substituted for steel fabrication materials in these dies, provided only that the required machinability, strength and wear resistance are insured. Examples of other materials which could be employed, most desirably for pins or pin surfaces subject to the greatest wear in use, are hard intermetallic or ceramic materials such as the metal carbides, nitrides, carbonitrides and borides. Due to the relatively small size of the bonding interfaces required between the die body materials and the pins in the discharge section, a considerable mismatch in thermal expansion between the pins and die body can be tolerated. The requirement for utility is simply that the selected materials exhibit sufficient material compatibility to permit reasonable bond strength between the die body and the pins to be realized.

Permanently joining the pin array to the die body plate to provide a durably bonded assembly can be accomplished using conventional metal or intermetallic fastening or joining techniques. In principle, any assembly method, including soldering, brazing or even mechanical fastening, could be used, but the preferred method of pin attachment is diffusion bonding. The latter method forms an extremely well-bonded die assembly which readily meets the strength and dimensional targets required of finely structured extrusion dies.

U. S. Pat. No. 3,678,570 to Plaulonis et al. describes one suitable type of diffusion bonding procedure, particularly useful for superalloy and stainless steel bonding, wherein thin alloy interlayers are used to assist the diffusion bonding process through the formation of a transient liquid phase. These interlayers promote good diffusion bonding of similar materials at temperatures and pressures somewhat lower than required for conventional diffusion processes.

The invention may be further understood by reference to the following Example, which is intended to be illustrative rather than limiting.

EXAMPLE

Steel stock for a die body for a supported pin array to be used to form the discharge section of the die is first selected. That stock consists of a steel body plate having a thickness of about 2.8 cm (1.1 in), composed of Type 422 PM stainless steel (Type 422 steel consolidated from steel powder). This plate is gun-drilled to provide a feedhole array consisting of about 32 holes/cm2 (200 holes/in2) of plate surface. The surfaces of the plate are then ground and polished to provide a finished body plate with an array of smooth through-holes.

A supported pin array for the die is next formed from a hardened steel face plate of Type 422 PM stainless steel having a thickness of about 12.7 mm (0.5 in). The faces of this plate are ground flat and parallel and then a discharge slot array comprising two arrays of parallel slots is cut into one surface of the plate. The arrays intersect each other at a 90° angle and the slots in each array have a uniform slot spacing of 2.5 mm (0.053 in). Thus a uniform array of square "pins" is formed by the slots in the surface of the plate.

The method used to form the slots in the plate surface is abrasive wheel grinding. Thin boron nitride abrasive wheels are used to slot the plate to a depth of 3.81 mm (0.15 in) from the plate surface. The slots are of dual width design, having a width of about 0.36 mm (0.014 in) at the machined surface of the plate and to a depth of about 0.89 mm (0.035 in) from the surface, and having a width of about 0.18 mm (0.007 in) over the bottom 2.92 mm (0.115 in) of slot depth.

The body and supported pin array thus provided are next assembled into a preform for an extrusion die. The pin array is positioned on top of the body plate with the machined (slotted) surface of the pin plate in contact with one of the smoothed drilled surfaces of the body plate. The pin array is carefully positioned on the body plate to insure that each of feedholes in the body plate is aligned with a slot in the pin plate.

The die body and pin array thus aligned are bonded together under heat and pressure to provide an integral die preform. The bonding method used is a conventional diffusion bonding procedure utilizing a single layer of NiP bonding alloy plated to a thickness of about 5 μm onto the drilled surface of the die body. Permanent bonding of the pin roots to the die body is then effected by pressing the array against the body and heating the assembly to a peak temperature of 1000 ° C. under a peak pressure of 992 psi (6.84 MPa). After bonding and cooling, the assembly is subjected to a conventional tempering cycle for 400 series stainless steels.

The bonded preform thus provided is next subjected to a face plate machining step. In this step the pin support section of the slotted pin plate is removed from the surface of the assembly. The layer removed is of sufficient thickness to expose the ends of the discharge slots machined into the opposite surface of the pin plate, thereby forming the discharge face of the die. Wire electrical discharge machining is the method used to remove the desired layer of surface material.

Finally, the die with exposed pins and discharge slots is ground and/or polished to smooth the discharge face and other external and internal surfaces of the die. If desired, the die may then be tempered, and/or it may be provided with any of the known wear coatings considered useful for the particular honeycomb extrusion application of interest. Examples of known wear coatings used for the extrusion of abrasive ceramic-powder-based batch materials include titanium nitride, titanium carbide, titanium carbonitride, or the like.

A particular advantage of extrusion dies provided in accordance with the invention is extended service life, especially for the extrusion of plasticized batches containing abrasive particulate ceramic materials. Because the feed streams delivered to the discharge section of the die are not directed against the root areas of the pins, pin wear at the pin root is reduced to levels no greater than those experienced in the body section of the die.

In addition, due to the higher inter-pin clearances in the pin root region, feedhole locations can more easily be changed from pin corner locations to pin side or so-called "mid-slot" locations within the die. In the latter case, pin wear can be largely confined to side rather than corner pin surfaces, delaying the undesirable changes in pin corner shape which cause product defects such as enlarged wall intersections or so-called "swollen center posts".

We claim:

1. A method for making a honeycomb extrusion die which comprises the steps of:

providing a die body having a die inlet face and a feedhole outlet face, the die body including an array of feed channels extending through the die body from the inlet face to feed channel openings on the outlet face;

providing at least one pin array on a pin support, the pin array comprising a plurality of pins attached to and extending outwardly from the pin support, the pins collectively terminating at pin root ends lying in a common plane, the pin array being formed by cutting slots partially through a solid composite plate comprising a layer of wear material bonded to a layer of pin support material such that the slots extend through the wear material, the pin support material being formed of a material having a thermal expansion coefficient and high temperature creep behavior close to that of the die body and the wear material differing in composition and hardness from the pin support material;

assembling the die body and pin array so that the pin root ends are aligned with pin attachment points on the feedhole outlet face of the die body, the pin attachment points being located between the feed channel openings;

attaching the pin root ends to the attachment points on the outlet face; and separating the pin support from the plurality of pins.

2. A method in accordance with claim 1 wherein the root ends of the pins have a cross-sectional area less than the cross-sectional area of the opposite ends of the pins.

3. A method in accordance with claim 1 wherein the die body and pin support are composed of steels with similar thermal expansion coefficients.

4. A method in accordance with claim 1 wherein the pins are formed of a material selected from the group consisting of metal carbides, metal nitrides, metal borides, and metal carbo-nitrides.

* * * * *